(12) United States Patent
Lipa

(10) Patent No.: US 10,190,462 B2
(45) Date of Patent: Jan. 29, 2019

(54) PUMP FOR A SECONDARY AIR SYSTEM OF AN INTERNAL COMBUSTION ENGINE

(71) Applicant: Continental Automotive GmbH, Hannover (DE)

(72) Inventor: Jaroslav Lipa, Cheb (CZ)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/316,591

(22) PCT Filed: Jun. 1, 2015

(86) PCT No.: PCT/EP2015/062066
§ 371 (c)(1),
(2) Date: Dec. 6, 2016

(87) PCT Pub. No.: WO2015/185471
PCT Pub. Date: Dec. 10, 2015

(65) Prior Publication Data
US 2017/0145888 A1 May 25, 2017

(30) Foreign Application Priority Data
Jun. 6, 2014 (DE) .................. 10 2014 210 884

(51) Int. Cl.
*F01N 3/00* (2006.01)
*F01N 3/22* (2006.01)
(Continued)

(52) U.S. Cl.
CPC ............ *F01N 3/225* (2013.01); *F01N 3/323* (2013.01); *F01N 11/00* (2013.01); *F04B 51/00* (2013.01);
(Continued)

(58) Field of Classification Search
CPC ................ F01N 11/00; F01N 2560/08; F01N 2900/1804; F01N 3/225; F01N 3/323
See application file for complete search history.

(56) References Cited

U.S. PATENT DOCUMENTS

| 6,983,590 B2 | 1/2006 | Roelle et al. ................... 60/289 |
| 7,260,928 B2 | 8/2007 | Wakahara et al. .............. 60/289 |

(Continued)

FOREIGN PATENT DOCUMENTS

| CN | 1898460 A | 1/2007 | ............... F01N 3/32 |
| DE | 10344910 A1 | 5/2004 | ............. F01N 11/00 |

(Continued)

OTHER PUBLICATIONS

German Office Action, Application No. 102014210884.5, 7 pages, Jan. 22, 2015.

(Continued)

*Primary Examiner* — Audrey K Bradley
*Assistant Examiner* — Anthony Ayala Delgado
(74) *Attorney, Agent, or Firm* — Slayden Grubert Beard PLLC

(57) ABSTRACT

The present disclosure relates generally to aftertreatment of exhaust gases in internal combustion engines. The teachings thereof may be embodied in a method for operating a secondary air system comprising: measuring an actual pressure downstream of a pump of the secondary air system; acquiring a dynamic pressure based on the actual pressure, characteristic of changes caused by dynamic operation of the engine; acquiring a basic pressure based on peripheral conditions of the secondary air system; calculating a model pressure based on the basic and the dynamic pressure; determining a capacity of the pump based on a ratio between the model pressure and the actual pressure; and adjusting operation of the secondary air system based on the capacity.

7 Claims, 3 Drawing Sheets

(51) Int. Cl.
*F01N 11/00* (2006.01)
*F01N 3/32* (2006.01)
*F04B 51/00* (2006.01)
*F04D 27/00* (2006.01)

(52) U.S. Cl.
CPC ........ *F04D 27/001* (2013.01); *F01N 2550/05* (2013.01); *F01N 2550/14* (2013.01); *F01N 2560/08* (2013.01); *F01N 2900/1804* (2013.01); *Y02T 10/47* (2013.01)

(56) References Cited

U.S. PATENT DOCUMENTS

| | | | |
|---|---|---|---|
| 7,562,565 B2 | 7/2009 | Heinrich et al. | 73/114.69 |
| 7,881,852 B2 * | 2/2011 | Heinrich | G01M 3/025 701/102 |
| 8,015,804 B2 | 9/2011 | Muraguchi | 60/289 |
| 2005/0138919 A1 | 6/2005 | Nakano et al. | 60/284 |
| 2012/0240908 A1 | 9/2012 | Kado et al. | 123/559.1 |

FOREIGN PATENT DOCUMENTS

| | | | | |
|---|---|---|---|---|
| DE | 102005044398 A1 | 4/2006 | | F01N 3/22 |
| DE | 102005003591 A1 | 8/2006 | | F01N 11/00 |
| DE | 102006021964 A1 | 11/2007 | | F01N 11/00 |
| DE | 102007062794 A1 | 7/2009 | | G01M 3/26 |
| DE | 102012222868 A1 | 6/2014 | | F01N 11/00 |
| JP | 11229861 A | 8/1999 | | F01N 3/22 |
| JP | 2004308491 A | 11/2004 | | F01N 3/22 |
| KR | 20140104780 A | 8/2014 | | F02D 33/02 |
| KR | 20140133027 A | 11/2014 | | F02B 37/00 |
| WO | 2013/102845 A1 | 7/2013 | | F01N 3/22 |
| WO | 2015/185471 A1 | 12/2015 | | F01N 11/00 |

OTHER PUBLICATIONS

International Search Report and Written Opinion, Application No. PCT/EP2015/062066, 18 pages, Aug. 14, 2015.
Chinese Office Action, Application No. 201580030162.2, 14 pages, Jun. 4, 2018.
Korean Notice of Allowance, Application No. 2018036445221, 3 pages, May 30, 2018.

* cited by examiner

PUMP FOR A SECONDARY AIR SYSTEM OF AN INTERNAL COMBUSTION ENGINE

CROSS-REFERENCE TO RELATED APPLICATIONS

This application is a U.S. National Stage Application of International Application No. PCT/EP2015/062066 filed Jun. 1, 2015, which designates the United States of America, and claims priority to DE Application No. 10 2014 210 884.5 filed Jun. 6, 2014, the contents of which are hereby incorporated by reference in their entirety.

TECHNICAL FIELD

The present disclosure relates generally to aftertreatment of exhaust gases of an internal combustion engine. The teachings thereof may be embodied in methods for determining the pump capacity of a pump of a secondary air system, a device for carrying out the methods, and/or an internal combustion engine.

BACKGROUND

In internal combustion engines, and in particular for spark ignition engines, reducing environmentally damaging emissions is a high priority. To this end, some engines are equipped with a secondary air system activated in a known fashion in a warming up phase to achieve rapid heating of a catalytic converter, located in an exhaust section of the internal combustion engine, to its operating temperature. The emission of the exhaust gas components HC and CO is thereby reduced in the warming up phase. Exhaust gas tests reveal a large part of the emissions of pollutants are emitted in the warming up phase of the corresponding internal combustion engine. Therefore, to reduce emissions of pollutants, the exhaust gas catalytic converter is heated as quickly as possible to its operating temperature of, for example, 500° C.

Accelerated heating of the exhaust gas catalytic converter can be achieved in a known fashion by blowing or feeding in what is referred to as secondary air into the exhaust section of the internal combustion engine. The secondary air is fed in downstream of the outlet valves of the internal combustion engine, between the start of the exhaust section and the exhaust gas catalytic converter.

A corresponding secondary air system has an electric pump for pumping air and an air valve connected downstream to control the secondary air flow. Only when the secondary air valve is at least partially open can secondary air be fed to the exhaust section. In this document, unless stated otherwise, the secondary air pump is referred to for short as "pump", and the secondary air valve is referred to for short as "valve".

The heating of the exhaust gas catalytic converter by means of secondary air relies on a strongly exothermic reaction of the secondary air with non-burnt fuel in the hot exhaust gas of the internal combustion engine. The further oxidation of the fuel which has not (yet) been burnt upstream and in the exhaust gas catalytic converter gives rise to accelerated heating of the exhaust gas catalytic converter to its operating temperature. In this way, the emissions of pollutants in the warming up phase of the internal combustion engine are reduced and the suitable operating temperature (referred to as "light-off" temperature) of the exhaust gas catalytic converter is reached more quickly.

DE 103 44 910 A1 discloses a diagnostic method for a secondary air system using a model pressure. The model pressure taught is a function of the following four parameters: (a) electrical supply voltage or battery voltage; (b) ambient (air) pressure; (c) ambient temperature; and (d) mass flow of the air delivered by the at (secondary) pump. This method is also carried out using a multiplicity of characteristic diagrams requiring a large amount of expenditure, in particular for setting up a secondary air system whose (secondary) pump is monitored with respect to its efficiency.

SUMMARY

Owing to legal requirements, the secondary air system must be monitored during operation to determine whether the pump is generating at least a specific minimum air mass flow when required. The legislators have therefore prescribed that the current efficiency level of the pump be monitored. To estimate the current mass flow of secondary air, a pressure sensor located in the secondary air system and arranged between the pump and the valve measures the pressure of the secondary air in this region (when the valve is opened). The efficiency or the pump capacity of the pump may be monitored with a parameter obtained from the ratio or the quotient between (a) a model pressure and (b) an actual pressure.

In this context, the model pressure depends on the design of the respective secondary air system and also on its current operating conditions. The model pressure is acquired by a data processing unit, for example an engine controller. The actual pressure is measured by the pressure sensor. The model pressure can be acquired as a function of the following parameters: (a) electrical supply voltage for the (secondary) pump which typically corresponds to the current battery voltage of the respective motor vehicle; (b) ambient (air) pressure; (c) ambient temperature; (d) mass flow of the air delivered by the at (secondary) pump; and (e) rotational speed of the internal combustion engine.

Some embodiments of the present disclosure may include a method for determining the pump capacity of a pump (132) of a secondary air system (130) for an internal combustion engine (100). The method may include: measuring an actual pressure (Pact) by means of a pressure sensor (134) of the secondary air system (130), which pressure sensor (134) is arranged downstream of the pump (132); acquiring a dynamic pressure (Pdyn) on the basis of the measured actual pressure (Pact), wherein the dynamic pressure (Pdyn) is characteristic of those changes in the measured actual pressure (Pact) which are caused by dynamic operation of the internal combustion engine (100); acquiring a basic pressure (Pb) on the basis of currently present external peripheral conditions for the operation of the secondary air system (130); calculating a model pressure (Pm) on the basis of the acquired basic pressure (Pb) and the acquired dynamic pressure (Pdyn); and determining the pump capacity on the basis of a ratio between the calculated model pressure (Pm) and the measured actual pressure (Pact).

In some embodiments, at least (i) the measurement of the actual pressure (Pact), (ii) the acquisition of the dynamic pressure (Pdyn) and (iii) the acquisition of the basic pressure (Pb) are carried out during active operation of the secondary air system (130).

In some embodiments, the external peripheral conditions for the operation of the secondary air system (130) are characterized by (i) a current electrical supply voltage (VB)

for the pump (132), (ii) the ambient temperature (TAM) and (iii) the ambient pressure (AMP).

In some embodiments, the characterization of the external peripheral conditions is carried out exclusively on the basis of the physical variables of the supply voltage (VB), ambient temperature (TAM) and ambient pressure (AMP).

In some embodiments, the time profile of the measured actual pressure (Pact) has a multiplicity of oscillations which are bounded by a lower envelope curve (Pse) and an upper envelope curve, and wherein the dynamic pressure (Pdyn) is acquired on the basis of the lower envelope curve (Pse).

In some embodiments, the acquisition of the dynamic pressure (Pdyn) comprises sequentially registering sampled pressure values of the actual pressure (Pact) and wherein the lower envelope curve (Pse) is acquired by identifying local minimum values of the sampled pressure values.

In some embodiments, the calculation of the model pressure (Pm) comprises forming a sum from the acquired basic pressure (Pb) and the acquired dynamic pressure (Pdyn).

Some embodiments may include a device for determining the pump capacity of a pump (132) of a secondary air system (130) for an internal combustion engine (100). The device (150) may comprise: a registration unit (252) for receiving an actual pressure (Pact) from a pressure sensor (134) of the secondary air system (130), which pressure sensor is arranged downstream of the pump (132); a first acquisition unit (254) for acquiring a dynamic pressure (Pdyn) on the basis of the measured actual pressure (Pact), wherein the dynamic pressure (Pdyn) is characteristic of those changes in the measured actual pressure (Pact) which are caused by dynamic operation of the internal combustion engine (100); a second acquisition unit (256) for acquiring a basic pressure (Pb) on the basis of currently present external peripheral conditions for the operation of the secondary air system (130); and a processor (258) (i) for calculating a model pressure (Pm) on the basis of the acquired basic pressure (Pb) and the acquired dynamic pressure (Pdyn) and (ii) for determining the pump capacity on the basis of a ratio between the calculated model pressure (Pm) and the measured actual pressure (Pact).

Some embodiments may include a system for determining the pump capacity of a pump (132) of a secondary air system (130) for an internal combustion engine (100). The system may comprise: a device (250) as described above and a pressure sensor (134) for measuring the actual pressure (Pact) in the secondary air system (130), wherein the pressure sensor (134) is coupled to the registration unit (252) and is configured to transfer the actual pressure (Pact) to the registration unit (252) of the device (150).

Some embodiments may include an internal combustion engine embodied, in particular, as a spark ignition engine. The internal combustion engine (100) may comprise: an engine block (110) having at least one combustion chamber (112); an exhaust section (120) for conducting away exhaust gases generated in the combustion chamber (112); a secondary air system (130) for feeding secondary air into the exhaust section (130); and a system (150, 134) as described above.

BRIEF DESCRIPTION OF THE DRAWINGS

Further advantages and features of the present disclosure can be found in the following description of exemplary embodiments. The individual figures of the drawing of this document are to be considered merely as schematic and as not true to scale.

Figure 1:
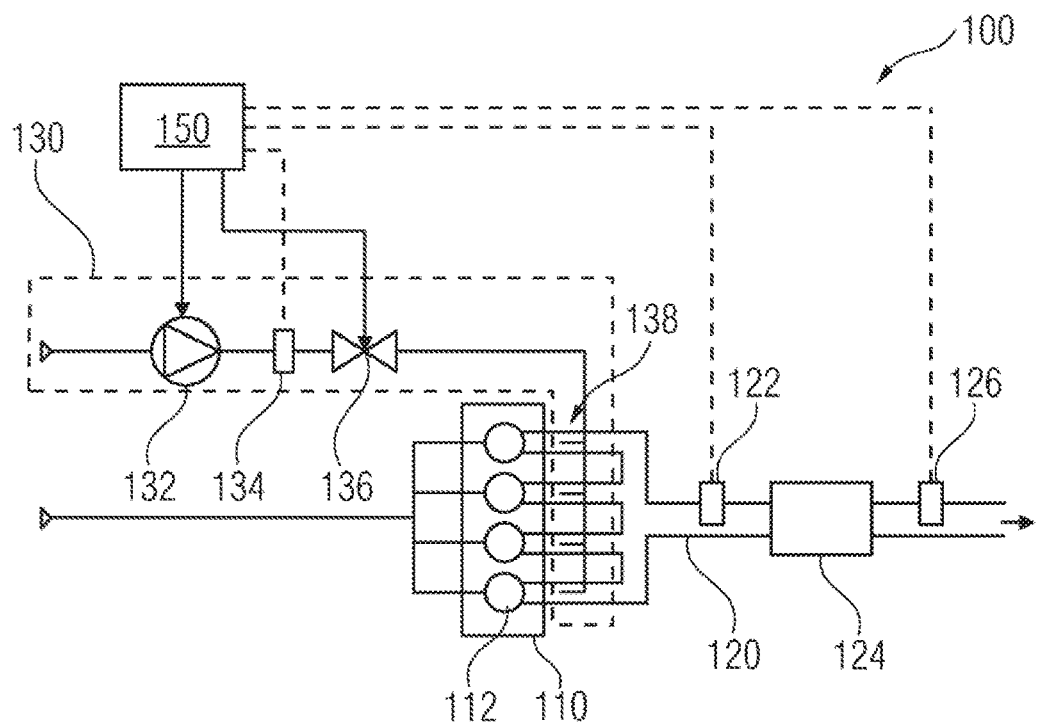
FIG. 1 shows an internal combustion engine having a secondary air system and an engine control unit which is configured to carry out or control a method for determining the pump capacity of a pump of the secondary air system.

It is to be noted that features or components of different embodiments may be the same as or at least functionally similar to the corresponding features or components according to the embodiment. These are provided with the same reference symbols or with other reference symbols which differ merely in their first number from the reference symbol of a (functionally) corresponding feature or a (functionally) corresponding component. In order to avoid unnecessary repetitions, features or components which have already been explained by means of a previously described embodiment are no longer explained in detail at a later point.

In addition, it is to be noted that the embodiments described below merely constitute a limited selection of possible embodiment variants of the invention. In particular, it is possible to combine the features of individual embodiments with one another in a suitable way, and therefore the person skilled in the art is to consider the embodiment variants which are illustrated here explicitly as obviously disclosing a multiplicity of various embodiments.

DETAILED DESCRIPTION

Some embodiments may include a method for determining the pump capacity of a pump of a secondary air system for an internal combustion engine. The method may comprise (a) measuring an actual pressure by means of a pressure sensor of the secondary air system, which pressure sensor is arranged downstream of the pump; (b) acquiring a dynamic pressure on the basis of the measured actual pressure, wherein the dynamic pressure is characteristic of those changes in the measured actual pressure which are caused by dynamic operation of the internal combustion engine; (c) acquiring a basic pressure on the basis of currently present external peripheral conditions for the operation of the secondary air system; (d) calculating a model pressure on the basis of the acquired basic pressure and the acquired dynamic pressure; and (e) determining the pump capacity on the basis of a ratio between the calculated model pressure and the measured actual pressure.

Such methods use a model pressure determination of the pump capacity that may have been corrected just as much as the actual pressure or the measured pressure signal of the pressure sensor. In this context, it is assumed that the (dynamic) correction requirement for the basic pressure which is used to calculate the model pressure is the same as or at least proportional to the correction requirement for the actual pressure. This is attributable to the fact that fluctuations which are to be corrected are conditioned by the system. The stated dynamic pressure is used for this correction. The calculation of a model pressure based on the acquired basic pressure and the acquired dynamic pressure corresponds to a correction of the basic pressure. This dynamic correction is performed by means of the dynamics extracted from the measured pressure signal (sensor signal). The calculation of the model pressure based on the acquired basic pressure and the acquired dynamic pressure corresponds therefore to a (dynamic) correction of the basic pressure. This correction can comprise extraction of the dynamic behavior of the pressure signal (sensor signal).

The dynamic pressure may reflect those changes over time in the measured actual pressure which result from the dynamic component of the operation of the internal combustion engine. In the case of steady-state operation in the internal combustion engine the dynamic pressure is diminished. To be clear, when the methods described here are carried out, it may be assumed that all the changes in pressure which occur in the secondary air system during the operation of the secondary air system, i.e., during the blowing in of secondary air into the exhaust section of the internal combustion engine, are caused merely by dynamic changes in the operation of the internal combustion engine. Such dynamic changes, which may arise, in particular, from a variation of what is referred to as the exhaust gas backpressure in the exhaust section of the internal combustion engine can arise from a positive or negative acceleration of the vehicle which is driven by the internal combustion engine. A negative change in pressure can be produced, in particular, by what is referred to as overrun cut-off. Furthermore, the dynamic changes can arise, for example, from opening or closing of a bypass valve (what is referred to as a waste gate) used in a known fashion to regulate the charge pressure of a turbocharger in the exhaust gas flow of the internal combustion engine.

In the methods described, the measured pressure signal for the actual pressure is conditioned in a suitable way. This conditioning results in the dynamic pressure which represents the dynamics extracted from the measured pressure signal. As a consequence of this condition, the measured pressure signal of the actual pressure can be compared directly with the value of the model pressure and in this way the pump capacity which is currently being made available by the pump of the secondary air system can be determined easily and effectively and with a high level of accuracy.

The basic pressure can also be referred to in a figurative fashion as the nominal pressure of the pump. The basic pressure in fact characterizes that pump capacity which is made available by the pump under the currently present external peripheral conditions for the operation of the secondary air system. It is to be noted that when this document describes that a pressure is measured, determined, acquired or calculated, it is, of course, meant that a corresponding value for the pressure is measured, determined, acquired or calculated.

The term "downstream" refers to the direction of flow of the corresponding medium, here the secondary air. In this case, this means that the flowing secondary air firstly passes through the pump and then flows past the pressure sensor or flows through a spatial registration region of the pressure sensor.

The pressure sensor may be arranged between the pump and a valve referred to as a secondary air valve. The measured pressure signal from the pressure sensor of the secondary air system may be used for diagnosing the secondary air valve based on the determined pump capacity. The pressure sensor may be upstream of the secondary air valve in the secondary air system.

In some embodiments, at least (i) the measurement of the actual pressure, (ii) the acquisition of the dynamic pressure, and (iii) the acquisition of the basic pressure are carried out during active operation of the secondary air system.

The expression "active operation of the secondary air system" refers to an operating state of the secondary air system in which, on the one hand, the pump is switched on and therefore delivers secondary air and, on the other hand, the secondary air valve is opened that the conveyed secondary air can also actually flow into the exhaust section. The determination of the pump capacity then takes place under operating conditions relevant for the operation of the secondary air system.

The entire method may be carried out without unnecessary delays. The calculation of the model pressure and the determination of the pump capacity are carried out without delay as soon as the input values which are necessary therefor have become known. The described methods can therefore even be carried out in real time when necessary.

In some embodiments, the external peripheral conditions for the operation of the secondary air system are characterized by (i) a current electrical supply voltage for the pump, (ii) the ambient temperature, and (iii) the ambient pressure. In the case of a pump used for secondary air systems, the pump capacity which can be made available depends to a considerable degree on the supply voltage of the pump, so this voltage dependence affects reliable determination of the pump capacity. However, in practice this does not constitute a particular difficulty because a manufacturer of such pumps makes the corresponding characteristic curves available to its customers.

Changes in the density of the sucked-in air from the surroundings are accounted in the method described here by means of suitable factors which describe the dependence of the density on the temperature and on the pressure of the surroundings of the secondary air system. Since these factors depend on simple physical variables which describe the surrounding air as gas, these corrections also do not constitute a particular feature during the execution of the described method.

In some embodiments, the characterization of the external peripheral conditions is carried out exclusively on the basis of the physical variables of the supply voltage, ambient temperature and ambient pressure. Compared to known methods, the determination of the pump capacity of the pump therefore requires fewer variables to characterize the external peripheral conditions for the operation of the secondary air system. In particular, in the method described here neither the mass flow of the conveyed air nor the rotational speed of the internal combustion engine is taken into account. As a result, the described method can be carried out with significantly less expenditure on computing. Furthermore, the accuracy or the reliability of the determination of the pump capacity is increased as a result of the reduced number of input parameters which each entail an unavoidable degree of (measuring) uncertainty.

The dependencies which are necessary to characterize the external peripheral conditions can be described by means of suitable functions, for example polynomials of a suitable order. The respective dependencies can, however, also be taken into account by means of corresponding look-up tables for correction factors. Since the present method contains only three dependencies, the corresponding expenditure in terms of measuring equipment for determining the look-up table/tables is reduced correspondingly compared to known diagnostic methods.

In some embodiments, the time profile of the measured actual pressure has a multiplicity of oscillations which are bounded by a lower envelope curve and an upper envelope curve. In addition, the dynamic pressure is acquired on the basis of the lower envelope curve. The use of the lower envelope curve provides that high-frequency components in the measured actual pressure do not have to be taken into account, and are not considered either. Such high-frequency oscillations can result, in particular, from the opening and closing of outlet valves of the internal combustion engine which is in operation. In order to register the lower envelope curve, known extraction methods can be used.

In some embodiments, the acquisition of the dynamic pressure comprises sequentially registering sampled pressure values of the actual pressure. In addition, the lower envelope curve is acquired by identifying local minimum values of the sampled pressure values. The lower envelope curve and therefore the time profile of the dynamic pressure can be acquired in a particularly simple and nevertheless reliable fashion. The known Nyquist-Shannon sampling theorem may be used for reliable extraction of the lower envelope curve. Accordingly, the sampling would be carried out at a correspondingly high frequency. Then, a minimum pressure value, which is used to determine the lower envelope curve, can be found for each cylinder or for each segment of a multi-cylinder internal combustion engine. This extraction of the lower envelope curve can be implemented by means of known envelope curve extraction procedures.

The sequential registration of the sampled pressure values can be carried out by means of equidistant steps. In this context, the step length can relate to the time of, or alternatively to the change in, a rotational angle of a crankshaft of the internal combustion engine.

In some embodiments, the calculation of the model pressure comprises forming a sum from the acquired basic pressure and the acquired dynamic pressure. Then, the model pressure can be calculated in a particularly simple way. It is to be noted that this simple method of calculating the model pressure is not at the expense of the accuracy and/or the reliability of the described method. The formation of the sum from the basic pressure and the acquired dynamic pressure in fact reflects the simple physical consideration that in fact a pressure can be made up of various partial pressures, to each of which a specific physical origin can be attributed.

Some embodiments may include a device for determining the pump capacity of a pump of a secondary air system for an internal combustion engine. The device may include: (a) a registration unit for receiving an actual pressure from a pressure sensor of the secondary air system arranged downstream of the pump; (b) a first acquisition unit for acquiring a dynamic pressure on the basis of the measured actual pressure, wherein the dynamic pressure is characteristic of those changes in the measured actual pressure which are caused by dynamic operation of the internal combustion engine; (c) a second acquisition unit for acquiring a basic pressure on the basis of currently present external peripheral conditions for the operation of the secondary air system; and (d) a processor for calculating a model pressure on the basis of the acquired basic pressure and the acquired dynamic pressure and for determining the pump capacity on the basis of a ratio between the calculated model pressure and the measured actual pressure.

In the case of a, in principle known, model pressure for determining the pump capacity of a pump of a secondary air system, a corrected model pressure can be used which has been corrected in the same way as the measured actual pressure, since chronological fluctuations which are attributable to dynamic changes are system-induced. For the corresponding correction of the basic pressure used to calculate the model pressure, the pressure signal of the pressure sensor is suitably conditioned. The measured pressure signal can therefore be compared directly with the model value.

The described devices have, with the registration unit, the two acquisition units and the processor, a multiplicity of functional units which together are able to carry out the method described above. It is not necessary for the described functional units to be implemented spatially separately from one another. In particular, the entire functionality necessary to carry out the method described above can be implemented in an engine control unit which is programmed in a suitable way.

Diagnostics of a secondary air system can be carried out particularly easily with the described device. In particular, the correction which is necessary, and typically very inaccurate, with known diagnostic procedures, and the filtering of a pressure model value using characteristic diagrams which can only be produced with a very high level of expenditure on calibration, are dispensed with. Furthermore, the diagnostic result or the determined pump capacity, which is characterized by the ratio between (i) the calculated or corrected model pressure and (ii) the measured actual pressure, is at least largely independent of the current load point of the internal combustion engine. In this way, the uncertainty or the variation of the diagnostic results is greatly reduced.

Some embodiments may include a system for determining the pump capacity of a pump of a secondary air system for an internal combustion engine. The described system may comprise (a) a device of the type described above for determining the pump capacity of a pump of a secondary air system for an internal combustion engine and (b) a pressure sensor for measuring the actual pressure in the secondary air system, wherein the pressure sensor is coupled to the registration unit and configured to transfer the actual pressure to the registration unit of the device.

Some embodiments may include an internal combustion engine embodied, in particular, as a spark ignition engine. The described internal combustion engine may comprise (a) an engine block having at least one combustion chamber; (b) an exhaust section for conducting away exhaust gases generated in the combustion chamber; (c) a secondary air system for feeding secondary air into the exhaust section; and (d) a system of the type described above for determining the pump capacity of a pump of a secondary air system.

The system described above for determining the pump capacity of a pump of the secondary air system can be used to determine the pump capacity easily and effectively and with a high level of accuracy. As a result, the functional capability of a secondary air system can be checked at any time.

It is to be noted that embodiments have been described with reference to different scope. In particular, a number of embodiments are described as devices, and other embodiments are described as methods. However, when a person skilled in the art reads this application it will be immediately clear to said person that, unless explicitly stated otherwise, any desired combination of features which are associated with different types of subject matter is possible in addition to a combination of features which are associated with any one type of subject matter.

FIG. 1 shows, an exemplary internal combustion engine 100 having a secondary air system 130 and an engine control unit 150. By controlling the engine control unit 150, the method described below for determining the pump capacity of a pump 132 of the secondary air system 130 can be carried out.

Before an exemplary embodiment of the methods for determining the pump capacity of the pump 132 is described—it being also possible to consider said method as a diagnostic method for the entire secondary air system 130—FIG. 1 explains a number of subject-matter features of the internal combustion engine 100. As is apparent from FIG. 1, the internal combustion engine 100 has an engine block 110 in which a plurality of combustion chambers 112 are formed. According to the exemplary embodiment illustrated here, the internal combustion engine 100 is a 4-cylinder engine which has four combustion chambers 112. On the output side, the four combustion chambers 112 are connected to an exhaust section 120 of the internal combustion engine 100 via outlet valves (not illustrated). A catalytic converter 124 and two lambda probes 122 and 126 are arranged in a known fashion in the exhaust section 120.

In addition, the internal combustion engine 100 includes a secondary air system 130 which has, in a known fashion, a secondary air pump 132, a secondary air pressure sensor 134, and a secondary air valve 136. These components are also referred to below for short as pump 132, as pressure sensor 134, and as valve 136. As is apparent from FIG. 1, this pressure sensor 134 is installed in the exhaust section 120 upstream of the secondary air valve 136. If the secondary air system 130 is in an active state with a pump 132 switched on and with a valve 136 opened, secondary air is introduced or blown into the exhaust section 120 via secondary air outlet nozzles 138. This secondary air serves in a known fashion to make available an excess of oxygen during a warming up phase of the internal combustion engine 100, which excess of oxygen is used to burn not yet burnt fuel in the exhaust section 120 and as a result to heat the catalytic converter 124 to its operating temperature as quickly as possible.

The engine control unit 150 is connected to the pressure sensor 134 and the two lambda probes 122 and 126 via measuring lines (illustrated by dashes). The engine control unit 150 is connected to the pump 132 and to the valve 136 via continuous control lines.

Figure 2:
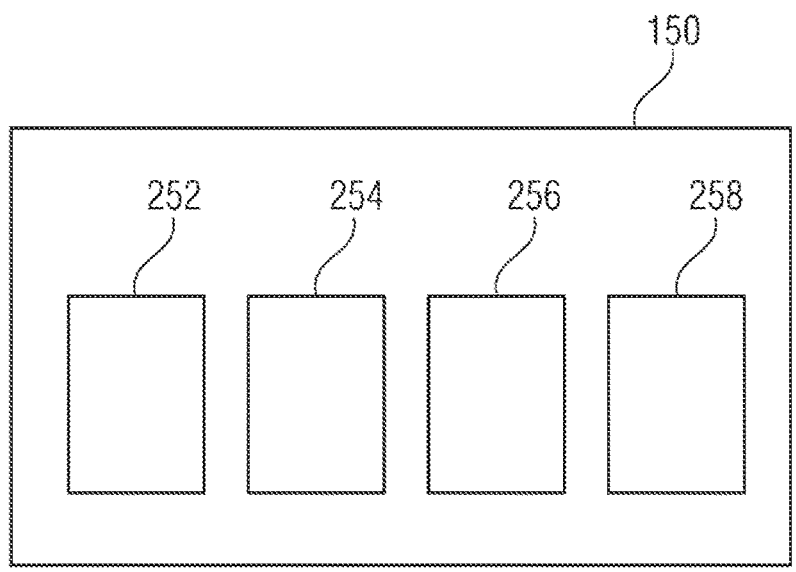
FIG. 2 shows a block diagram of the engine control unit shown in FIG. 1.

FIG. 2 shows a block diagram of the engine control unit 150 shown in FIG. 1. The engine control unit 150 has (a) a registration unit 252 for receiving an actual pressure from the pressure sensor 134 of the secondary air system 130, (b) a first acquisition unit 254 for acquiring a dynamic pressure on the basis of the measured actual pressure, wherein the dynamic pressure is characteristic of those changes in the measured actual pressure which are caused by dynamic operation of the internal combustion engine 100, (c) a second acquisition unit 256 for acquiring a basic pressure on the basis of currently present external peripheral conditions for the operation of the secondary air system 130, and (d) a processor 258. The processor is configured and used, on the one hand, to calculate a model pressure on the basis of the acquired basic pressure and the acquired dynamic pressure and, on the other hand, to determine the pump capacity of the pump 132 on the basis of a ratio between the calculated model pressure and the measured actual pressure.

According to the exemplary embodiment illustrated here, a sensor signal of the secondary air pressure sensor 134 is sampled equidistantly during the operation of the secondary air system 130. In this context, the "equidistance" can refer either to the time or to the crankshaft angle.

The methods may calculate a model value or a model pressure Pm for the pressure in the secondary air system 130, which model value does not contain a model of the exhaust gas backpressure. This exhaust gas backpressure is that pressure which is present at the location of the secondary air outlet nozzles 138 and is caused by the exhaust gases flowing through the exhaust section 120.

In this context it is easy to see that the pressure measured by the pressure sensor 134 results (a) from the mass flow of secondary air supplied by the pump 132 and (b) from the backpressure of the exhaust gas in the exhaust section 120. In accordance with a typical pump characteristic, the mass flow of the pump 132 is dependent on the operating voltage of the pump 132. This operating voltage is typically the battery voltage VB of a motor vehicle (not illustrated) which is driven by the internal combustion engine 100.

In addition, changes in the density of the air sucked in by the pump 132 from the surroundings are taken into account by factors which depend on the ambient temperature TAM and the ambient pressure AMP. The basic pressure Pb which is made available exclusively by the pump 132 is as a function of the battery voltage VB, the ambient temperature TAM, and the ambient pressure AMP:

$$Pb = f(VB, TAM, AMP) \quad (1)$$

This basic pressure Pb in the secondary air system 130 is acquired using the pressure sensor 134. For this purpose, the basic pressure Pb is evaluated based on the measured pressure signal. In addition, in the diagnostic methods described here it is assumed that all the changes in pressure occurring during operation of the secondary air system 130 are caused exclusively by changes in the driving behavior of a driver controlling the internal combustion engine 100. These changes can result, for example, from a positive or negative acceleration of the vehicle as well as from activation (opening or closing) of a turbocharger bypass valve (referred to as waste gate). However, it is to be noted that this enumeration is not conclusive and that other types of changes in the driving behavior can also lead to changes in pressure which are measured by the pressure sensor 134.

Systematically occurring pressure fluctuations are determined by analysis of the basic pressure Pb. In addition, to calculate the model pressure Pm, these determined system-induced pressure fluctuations are taken into account and the basic pressure Pb is correspondingly corrected. In this context, it is irrelevant which effects cause the respective pressure fluctuation, since an occurrence of an error during the operation of the secondary air system is excluded.

An overall pressure is a sum of partial pressures. Accordingly, the overall pressure Poverall or the actual pressure Pact which is registered by the pressure sensor 134 is composed of the sum of (a) the ambient pressure Patm, (b) the basic pressure Pb provided by the pump, and (c) the exhaust gas backpressure Pexh present in the exhaust section 120. This relationship is described in the following equation (2):

$$Poverall = Pact = Patm + Pb + Pexh \quad (2)$$

To simplify the further calculation, operations are carried out below with a differential pressure Pdif, for which the following applies:

$$Pdif = Pact - Patm = Pb + Pexh \quad (3)$$

Figure 3:
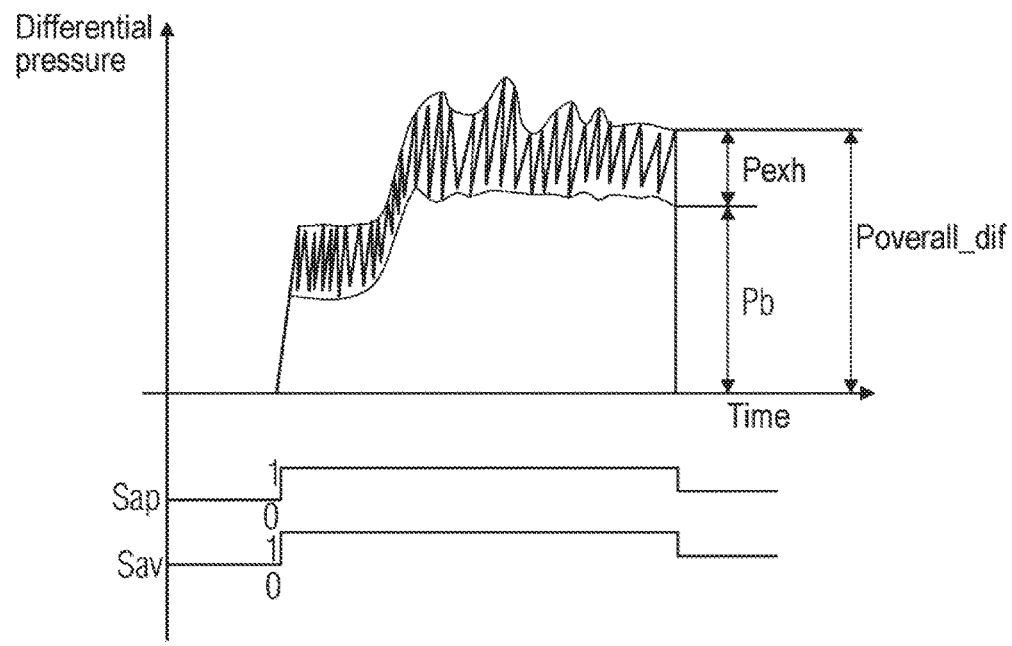
FIG. 3 shows, by means of a diagram, the time profile of a differential pressure which is registered using the pressure sensor shown in FIG. 1, during a steady operating state of the internal combustion engine.

FIG. 3 shows in a diagram the time profile of this differential pressure Pdif. The two lower curves illustrate the actuation of the pump 132 and the actuation of the valve 136. If the signal Sap assumes the value one, the pump 132 is operated, or the pump 132 is switched on. In a corresponding way, the valve 136 is opened if the signal Sav assumes the value one. If the signal Sap or the signal Sav assumes the value zero, the pump 132 is configured or the valve is closed.

In the upper part of the diagram in FIG. 3, the differential pressure Pdif is illustrated in the time window in which the secondary air system is active. The differential pressure Pdif has high-frequency oscillations which are attributable to the periodic opening and closing of outlet valves, by means of which exhaust gases resulting from the combustion process are introduced into the exhaust section 120 from the respective combustion chamber. The illustrated oscillations extend between a lower envelope curve and an upper envelope curve.

According to the embodiment illustrated here, in which steady-state or non-dynamic operation of the internal combustion engine is illustrated, at the start of the activity of the secondary air system both the lower envelope curve and the upper envelope curve assume a specific value. Later, both values rise to a relatively high plateau value. This rise represents a buildup of a pressure in the secondary air system 130. The lower envelope curve characterizes, in accordance with the standardization performed with the equation (3), the basic pressure Pb which is provided by the pump 132. The upper envelope curve represents the time profile of the differential pressure Pdif. The difference between the upper envelope curve and the lower envelope curve corresponds to the exhaust gas backpressure Pexh.

Figure 4:
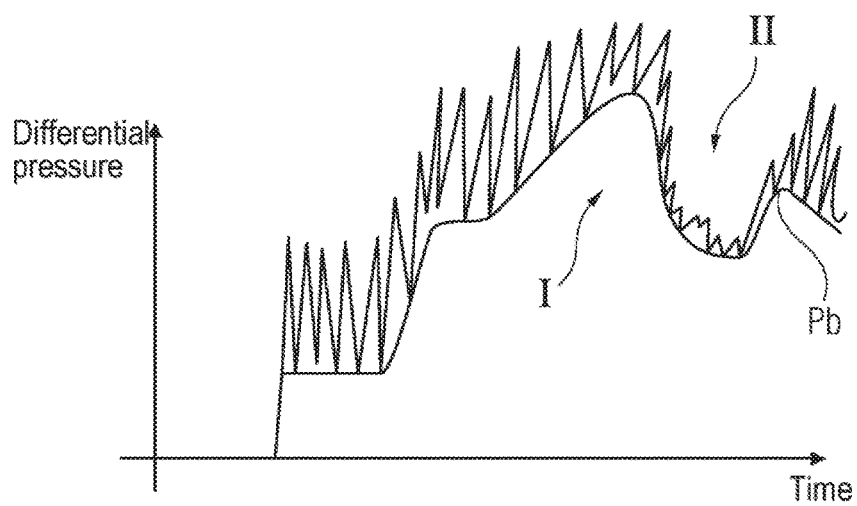
FIG. 4 shows, by means of a diagram, the time profile of a differential pressure which is registered using the pressure sensor shown in FIG. 1, during a dynamically changing operating state of the internal combustion engine.

FIG. 4 shows a diagram in which the time profile of the differential pressure Pdif during a dynamically changing operating state of the internal combustion engine or of the secondary air system 130 is illustrated. In a non-steady-state case, it is necessary to account for influence of the dynamically changing exhaust gas backpressure Pexh on the basic pressure Pb. The basic pressure Pb can in fact be increased by a raised exhaust gas backpressure Pexh (dynamic accelerating travel, region "I" in FIG. 4) or decreased by a reduced exhaust gas backpressure (overrun cut-off, region "II" in FIG. 4).

Because such dynamics have previously not been taken into account for the model pressure Pm, the basic pressure Pb must still be correspondingly corrected to determine a suitable model pressure Pm. According to the exemplary embodiment illustrated here, this is done by means of the equation (4):

$$Pm=Pb+Pdyn \quad (4)$$

Here, Pdyn is the corresponding dynamic correction which is extracted from the dynamics or from the dynamically changing pressure component Pdyn of the measured actual pressure Pact. The dynamically changing pressure component Pdyn is, according to the exemplary embodiment illustrated here, the lower envelope curve from the diagram in FIG. 4.

Figure 5:
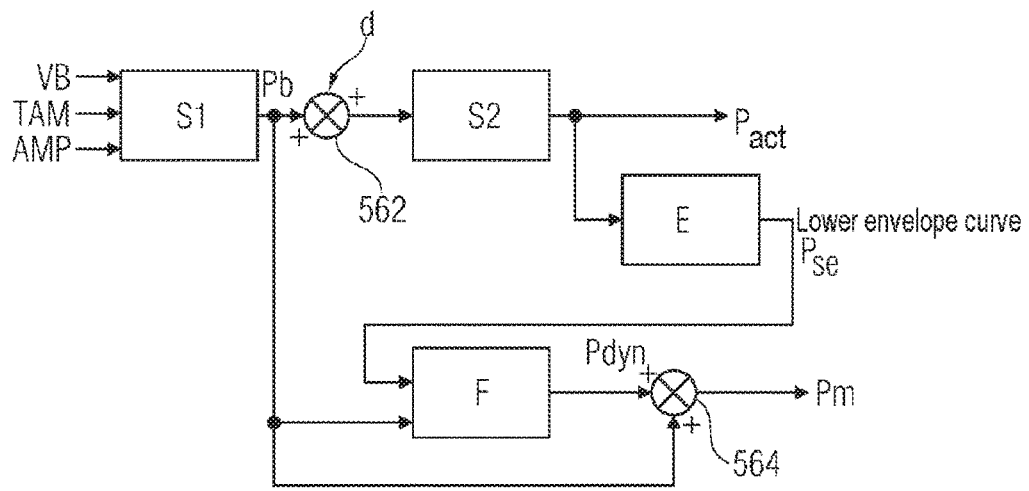
FIG. 5 shows a block diagram which illustrates an exemplary embodiment of a method for determining the pump capacity of the pump shown in FIG. 1.

FIG. 5 shows a block diagram which illustrates an exemplary embodiment of a method for determining the pump capacity of the pump 132. As is apparent from FIG. 5, the basic pressure Pb is firstly acquired by means of a first algorithm S1 on the basis of the input variables of the battery voltage VB, ambient temperature TAM, and ambient pressure AMP. For this acquisition, a characteristic curve is typically made available by the manufacturer of the pump 132. The system of the basic pressure Pb is therefore known.

In an adder unit 562, dynamic interference is added to this basic pressure Pb, said interference being denoted by the letter "d" and unknown. This interference "d" results generally from unknown transient or dynamically changing influences on the exhaust gas backpressure Pexh.

The algorithm or the block S2 represents the system of the differential pressure Pdif da, which, according to the above equation (3), represents the difference between the measured actual pressure Pact and the ambient pressure Patm.

The measured actual pressure Pact is also fed to an extractor E which extracts the lower envelope curve Pse from the highly oscillating differential pressure (see FIG. 4). The time profile of the lower envelope curve Pse is then fed, together with the known basic pressure Pb, to a block F which acquires the time profile of the dynamic pressure Pdyn. The dynamic pressure Pdyn is then added to the known basic pressure Pb by means of a further adder unit 564. This then results in the desired time profile of the model pressure Pm.

To be clear, the block diagram from FIG. 5 can also be described as follows:

(1) the system of the basic pressure S1 is known and can be modeled, for example, as a system of the first order or by means of a characteristic curve with the ambient temperature TAM temperature and a pressure or altitude correction AMP.
(2) The system of the overall pressure S2 is not known. Only the output of S1 (the differential pressure Pdif) can be observed or measured. It is obtained from the measured actual pressure Pact.
(3) The lower envelope curve of the differential pressure Pdif is extracted with the envelope curve extractor E. This extraction can easily be carried out by registering and evaluating the local minimum values of the highly oscillating differential pressure Pdif (see FIG. 4). For reliable envelope curve extraction, the known Nyquist-Shanon theorem for the minimum frequency of sampling of the actual pressure Pact must be satisfied. The totality of the identified local minimum values represents the lower envelope curve Pse. In the envelope curve extractor E, the corresponding minimum sampled actual pressure values are localized and the signal for the envelope curve is formed.
(4) The object of the block F is to determine the dynamics in the measured signal of the actual pressure Pact or in the differential pressure Pdif which is designated in accordance with the equation (3).

The dynamic pressure Pdyn can be calculated in the block F in accordance with the following equation (5):

$$Pdyn(i)=\Sigma_{k=1}^{i}[\Delta Pse(k)-\Delta Pm(k)] \quad (5)$$

After this determination of the dynamics or of the dynamic pressure Pdyn for various samplings i, the searched-for model pressure Pm is calculated on the basis of the following equation (6):

$$Pm(i)Pb(i)+Pdyn(i) \quad (6)$$

The ratio between the model pressure Pm calculated in this way and the measured actual pressure Pact characterizes the searched-for pump capacity of a pump 132. This is used to diagnose the secondary air system 130.

Figure 6:
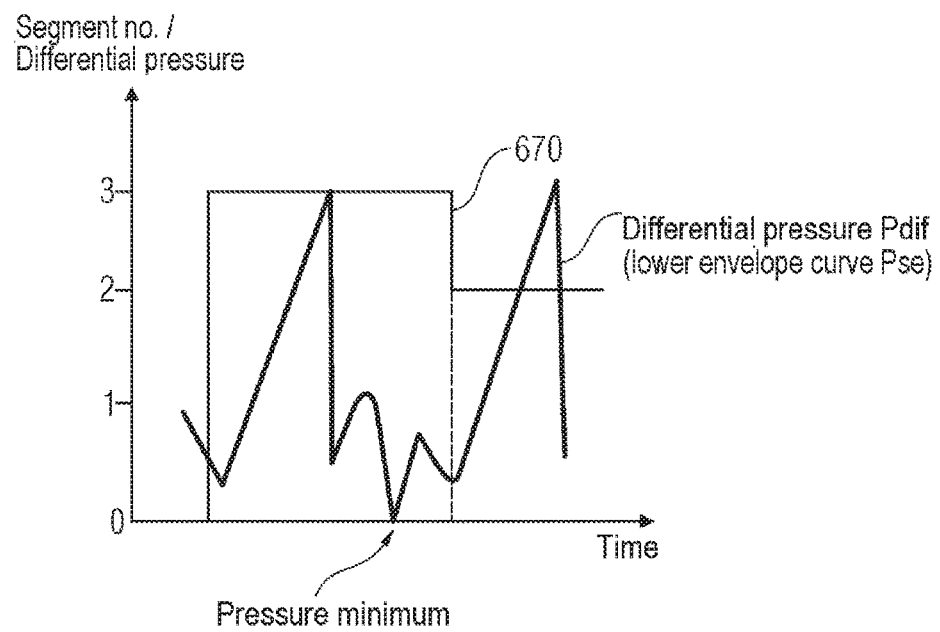
FIG. 6 shows, by means of a diagram, the time profile of the lower envelope curve of a differential pressure, which pressure can be acquired during the third segment of the operating cycle of a four-cylinder engine by the envelope curve extractor shown in FIG. 5.

FIG. 6 shows the time profile of the lower envelope curve Pse of a signal of the differential pressure which has been acquired according to an exemplary embodiment of the invention from the envelope curve extractor shown in FIG. 5. The plateau-like square-wave curve which is characterized by the reference number 670 illustrates in each case the active segment of the operating cycle of an internal combustion engine which is divided in a known fashion into various segments. According to the embodiment illustrated here, it is concerned with an internal combustion engine with four cylinders whose operating cycle is divided into the segments 0, 1, 2 and 3.

In FIG. 6, the lower envelope curve Pse, which has a 4-fold periodicity according to the segmentation of the operating cycle of the four-cylinder internal combustion engine, is represented in particular for the third segment. It is apparent that (the lower envelope curve Pse) of the differential pressure Pdif firstly rises strongly. This strong rise results from the opening of the at least one outlet valve which is assigned to the third cylinder. After a peak value, representing the absolute maximum of the differential pressure Pdif, has been reached, said value drops steeply. This drop can be explained by the flowing away of exhaust gas in the exhaust section 120. A pressure minimum is located between two subsequent local maximum values which are attributable to unknown interference. It is to be noted that in the diagram illustrated in FIG. 6, the angle of the crankshaft of the respective internal combustion engine can also be plotted on the abscissa instead of the time. In this case, a similar curve profile is obtained.

LIST OF REFERENCE SYMBOLS

100 Internal combustion engine
110 Engine block
112 Combustion chamber
120 Exhaust section
122 Lambda probe
124 Catalytic converter
126 Lambda probe
130 Secondary air system
132 Secondary air pump/pump
134 Pressure sensor
136 Secondary air valve/valve
138 Secondary air outlet nozzles
150 Engine control unit
252 Registration unit
254 First acquisition unit
256 Second acquisition unit
258 Processor
562 Adder unit
564 Adder unit
S1 System of basic pressure Pb (known)
d Interference (unknown)
S2 System of differential pressure Pdif (unknown)
E Extractor for lower envelope curve
F System of dynamic pressure Pdyn
670 Segmentation of operating cycle

What is claimed is:

1. A method for operating a secondary air system for an internal combustion engine, the method comprising:
measuring an actual pressure with a pressure sensor arranged downstream of a pump of the secondary air system;
acquiring a dynamic pressure based at least in part on the measured actual pressure, the dynamic pressure characteristic of changes in the measured actual pressure caused by dynamic operation of the internal combustion engine;
acquiring a basic pressure based at least in part on external peripheral conditions for operation of the secondary air system, wherein the external peripheral conditions include at least one condition selected from the group consisting of: an electrical supply voltage for the pump, an ambient temperature outside the engine, and an ambient pressure outside the engine;
calculating a model pressure based at least in part on the acquired basic pressure and the acquired dynamic pressure;
determining a capacity of the pump based at least in part on a ratio between the calculated model pressure and the measured actual pressure; and
adjusting operation of the secondary air system based on the determined capacity of the pump.

2. The method according to claim 1, wherein measuring the actual pressure, acquiring the dynamic pressure, and acquiring the basic pressure are carried out during active operation of the secondary air system.

3. The method according to claim 1, wherein a time profile of the measured actual pressure includes a multiplicity of oscillations bounded by a lower envelope curve and an upper envelope curve, and wherein the dynamic pressure is acquired on the basis of the lower envelope curve.

4. The method according to claim 3, wherein acquiring the dynamic pressure comprises sequentially registering sampled pressure values of the actual pressure and wherein the lower envelope curve is acquired by identifying local minimum values of the sampled pressure values.

5. The method according to claim 1, wherein calculating the model pressure comprises adding the acquired basic pressure to the acquired dynamic pressure.

6. An engine controller for a secondary air system for an internal combustion engine, the engine controller comprising programmed instructions stored in a non-transitory medium for:
receiving an actual pressure from a pressure sensor of the secondary air system, the actual pressure measured downstream of a secondary pump;
acquiring a dynamic pressure based at least in part on the actual pressure, the dynamic pressure characteristic of changes in the actual pressure caused by dynamic operation of the internal combustion engine;
acquiring a basic pressure based at least in part on external peripheral conditions for operation of the secondary air system, wherein the external peripheral conditions include at least one condition selected from the group consisting of: an electrical supply voltage for the pump, an ambient temperature outside the engine, and an ambient pressure outside the engine;
calculating a model pressure based at least in part on the acquired basic pressure and the acquired dynamic pressure and determining a capacity of secondary pump capacity based at least in part on a ratio between the calculated model pressure and the measured actual pressure;
determining a capacity of the pump based at least in part on a ratio between the calculated model pressure and the measured actual pressure; and
adjusting operation of the secondary air system based on the determined capacity of the pump.

7. An internal combustion engine comprising:
an engine block having at least one combustion chamber;
an exhaust section conducting away exhaust gases generated in the combustion chamber;
a secondary air system feeding secondary air into the exhaust section;
a pump pressurizing the secondary air system;
a pressure sensor measuring an actual pressure downstream of the pump; and
an engine controller comprising programmed instructions stored in a non-transitory medium for:

receiving the actual pressure;

acquiring a dynamic pressure based at least in part on the actual pressure, the dynamic pressure characteristic of changes in the actual pressure caused by dynamic operation of the internal combustion engine;

acquiring a basic pressure based at least in part on external peripheral conditions for operation of the secondary air system, wherein the external peripheral conditions include at least one condition selected from the group consisting of: an electrical supply voltage for the pump, an ambient temperature outside the engine, and an ambient pressure outside the engine; and calculating a model pressure based at least in part on the acquired basic pressure and the acquired dynamic pressure and determining a capacity of secondary pump capacity based at least in part on a ratio between the calculated model pressure and the measured actual pressure.

* * * * *